(No Model.)

L. E. WALBERG.
CART SPRING.

No. 405,193. Patented June 11, 1889.

Witnesses:
F. R. Cornwall
C. F. Mallard

Inventor:
Lars Erick Walberg
per
Stoddart & Co.
Attorneys

UNITED STATES PATENT OFFICE.

LARS ERICK WALBERG, OF HOLLISTER, CALIFORNIA.

CART-SPRING.

SPECIFICATION forming part of Letters Patent No. 405,193, dated June 11, 1889.

Application filed April 3, 1889. Serial No. 305,836. (No model.)

*To all whom it may concern:*

Be it known that I, LARS ERICK WALBERG, a citizen of the United States, residing at Hollister, in the county of San Benito and State of California, have invented new and useful Improvements in Cart-Springs, of which the following is a specification.

My invention relates to an improvement in cart-springs; and it consists in the construction and arrangement of the several parts hereinafter described and claimed.

The object of my invention is to provide a spring which will relieve the cart from the motion of the horse, and, further, to construct the same in a manner rendering its production cheap and its application simple and easy. I attain this object by the construction illustrated in the accompanying drawings, wherein like letters of reference indicate corresponding parts in the several views, and in which—

Figure 1:
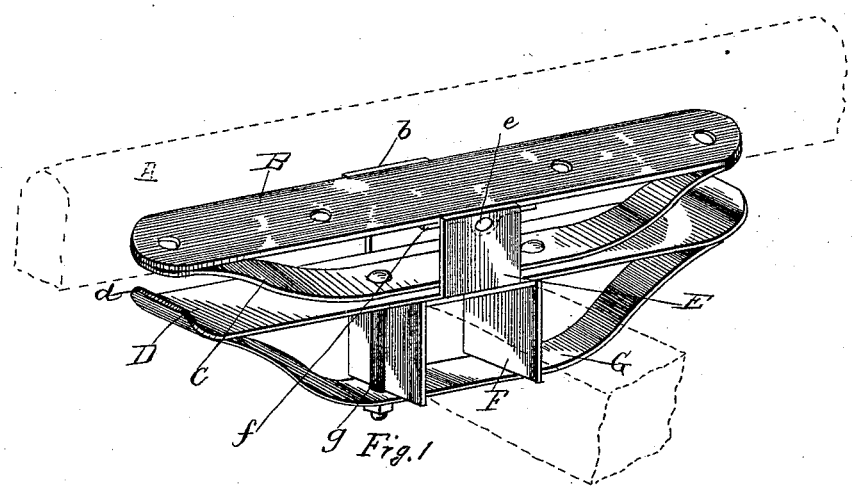
Figure 2:
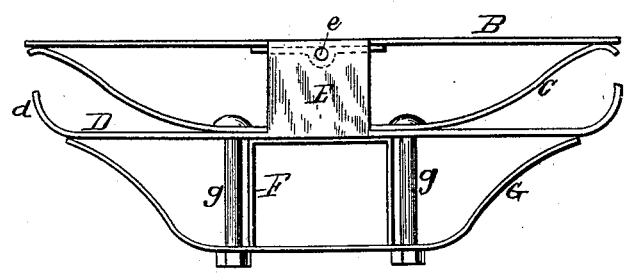

Figure 1 represents the spring with the axle and a shaft in place and partly broken away, and Fig. 2 is a side elevation.

In the drawings, A represents in dotted lines the shaft of a cart, to the under side of which is attached an elongated plate B, having a transverse bearing-plate $b$ on its under side at its center, (shown in dotted lines.)

Below the plate B is an upwardly-curved spring C, having its ends curved slightly downward and contacting with the under face of the outer ends of the plate. This spring C rests on and is rigidly secured to a stiff straight spring D, which has its outer ends $d$ curved up at right angles directly beneath the curved ends of springs C. Two ears E are extended up from the sides of the center of spring D to the plate B, through which pass the ends of a bearing-pin $e$, which passes through the bearing formed by plate $b$, thereby permitting the plate B to rock and yet supporting the same.

F represents a clip secured rigidly to the under side of the center of the spring D, the arms of which extend down on both sides of the axle.

G represents the bottom spring, having its ends bent up and resting against the under side of spring D. It is held in place below the axle and against the ends of clip F by the rods or bolts $g$, which pass through the same on both sides of the axle and through the springs D and C. This spring acts as an auxiliary spring, and also as the lower side of the clip.

The operation of the device is as follows: The spring being secured on the axle and the shaft secured to the top plate, which is pivoted to the ears on the spring D, a rocking movement of the shaft is permitted, the extent of which is governed by the springs, and all sudden shocks or movements of the shaft are received and prevented from being imparted to the vehicle by the springs, all slight movement being received by the upper spring and the more violent movement by the entire series of springs, thus preventing any discomfort to the occupant of the vehicle.

I am aware that many minor changes in the construction and arrangement of my device can be made and substituted for those shown and described without in the least departing from the nature and principle of my invention.

Having thus described my invention, what I claim as new, and desire to secure by Letters Patent, is—

1. The combination, with the axle and shaft of a cart, of a spring on the top of the axle, a plate pivoted to the spring and secured to the shaft, and a spring interposed between the said other spring and plate, substantially as described.

2. The combination, with the axle and shaft, of the spring D, having ears extending therefrom, the plate B, pivoted on the ears, the spring C between the said other spring and plate, and a spring below spring D and the axle, having its ends resting against the outer ends of the spring D, substantially as described.

3. The combination of the spring D, having clip F on its under side and ears $d$ on its upper side, the plate B, pivoted on the ears, the spring C between the plate and spring D, and the spring G below the axle and secured to said spring D, substantially as described.

In testimony whereof I affix my signature in presence of two witnesses.

LARS ERICK WALBERG.

Witnesses:
BERNARD COLEMAN,
JNO. L. HUDSON.